(12) United States Patent
Tung et al.

(10) Patent No.: US 7,982,345 B2
(45) Date of Patent: Jul. 19, 2011

(54) DISPLACEMENT TYPE GENERATOR

(75) Inventors: Mean-Jue Tung, Kinmen County (TW); Yu-Ting Huang, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 288 days.

(21) Appl. No.: 12/416,999

(22) Filed: Apr. 2, 2009

(65) Prior Publication Data

US 2010/0156201 A1 Jun. 24, 2010

(30) Foreign Application Priority Data

Dec. 22, 2008 (TW) ............... 97150142 A

(51) Int. Cl.
*H02K 33/00* (2006.01)
(52) U.S. Cl. ........................ 310/15; 310/12.12
(58) Field of Classification Search .............. 310/15, 310/12.12, 12.13, 12.24
See application file for complete search history.

(56) References Cited

U.S. PATENT DOCUMENTS

| | | | |
|---|---|---|---|
| 4,434,374 A | 2/1984 | Lundgren | |
| 6,952,060 B2 * | 10/2005 | Goldner et al. | 310/12.13 |
| 2003/0048011 A1 * | 3/2003 | Kashkarov et al. | 310/12 |
| 2004/0251750 A1 * | 12/2004 | Cheung et al. | 310/23 |
| 2005/0225181 A1 | 10/2005 | Tu et al. | |
| 2005/0231044 A1 | 10/2005 | Tu et al. | |
| 2008/0036306 A1 | 2/2008 | Terzian | |
| 2008/0054731 A1 | 3/2008 | Tu et al. | |
| 2008/0084121 A1 | 4/2008 | Kelly | |

FOREIGN PATENT DOCUMENTS

| | | |
|---|---|---|
| CN | 1604436 | 4/2005 |
| GB | 2065983 | 7/1981 |
| GB | 2359593 | 8/2001 |
| JP | 2001327197 | 11/2001 |
| JP | 2007215345 | 8/2007 |
| TW | 1271915 | 6/2003 |
| WO | 9831090 | 7/1998 |

OTHER PUBLICATIONS

English abstact of CN1604436.
English abstract of JP2001327197.
English abstract of JP2007215345.

* cited by examiner

*Primary Examiner* — Nguyen N Hanh
(74) *Attorney, Agent, or Firm* — Thomas|Kayden

(57) ABSTRACT

A displacement type generator including a magnet set and a coil set is provided. The magnet set includes a magnet with unidirectional magnetization and a first multi-polar magnetic structure, wherein the first multi-polar magnetic structure is disposed on the magnet. The coil set includes a magnetic center pole, a coil and a second multi-polar magnetic structure. The coil is wound on the magnetic center pole. The second multi-polar magnetic structure is disposed on the magnetic center pole and is adjacent to the first multi-polar magnetic structure. As a relative movement is generated between the magnet set and the coil set, the magnetic flux changes and causes the coil to output an induced voltage.

12 Claims, 3 Drawing Sheets

DISPLACEMENT TYPE GENERATOR

This application claims the benefit of Taiwan application Serial No. 97150142, filed Dec. 22, 2008, the subject matter of which is incorporated herein by reference.

BACKGROUND OF THE INVENTION

1. Field of the Invention

The invention relates in general to a generator, and more particularly to a displacement type generator which converts a unidirectional magnetic flux into a multi-polar magnetic flux.

2. Description of the Related Art

Conventional electromagnetic generators use the magnetic flux change generated by the relative movement between the coil and magnetic field, and then output a voltage generated in the coil according to Faraday's law. The electromagnetic generators can be divided into rotary type and displacement type generators according to the type of relative movement. The conventional rotary type generator, having the advantages of high conversion efficiency and large volume of power generation, has been widely used in large-scale generator facilities. However, the rotary type generator is disadvantaged by its big size.

In Japan Patent No. JP2001327197, people's acting force applied to the floor is converted into a rotation force, which is then used in the generator integrated with the walking auxiliary tool such as shoes or stick. In British Patent No. GB2359593, the displacement generated by the weight of a vehicle moving on the road is transmitted by a mechanical or fluid links to provide input to a rotary machine which powers an electrical power generator. In U.S. Pat. No. 4,434,374, the energy of a pedestrian or a vehicle is captured and converted into an input torque of a rotary type generator via a linking and transmission device. In British Patent No. GB2065983, a conversion mechanism is used for converting a reciprocating movement into a rotation movement, which is connected to a rotary type generator. In 1998, Massachusetts Institute of Technology disclosed a rotary type generator, which is disposed in sneakers and is driven by the acting force of the heel during walking. In 2005, the University of Pittsburgh also disclosed a suspended-load backpack, which converts mechanical energy from the vertical movement of carried loads to electricity via a rotary type generator with a toothed rack attached to the load. The rotary type generator has higher efficiency in electromagnetic conversion but normally needs to be combined with a mechanism such as spring, flywheel, and reduction gear. Therefore, the rotary type generator is complicated in structure, the integration with other components or devices is difficult, the magnitude of movement is large, and the reliability is hard to be increased.

The displacement type generator has a simpler structure and higher reliability compared with the rotary type generator. In Japan Patent JP2007215345, a plurality of magnets are arranged with their center axes aligned so that the adjacent magnetized poles repel each other to form a magnet bar, and a winding coil is fixed in the grounding at a position facing the boundary of these magnets. The power is generated by utilizing the movement of the magnet bar caused when persons walk or vehicles pass thereupon. United States Patent No. US2008084121, US2008054731, US2005225181, US2005231044, US2008036306 and World Patent No. WO9831090 each disclosed a linear generator that is constituted by magnets and coils, and the relative reciprocating movement between the magnets and the coils enables the coils to generate induction power. In 2004, Dr. Duffy of NUI Galway (National University of Ireland) disclosed a design of electromagnetic generators that can be integrated within shoe soles, when the pedestrian walks and the magnet wobbles, the device is driven to generate power. Generally speaking, the displacement type generator generates reciprocating movement by moving the magnet inside the coil. The moving stroke of the magnet is usually not small, and the magnetic flux loop is an open circuit, so the displacement type generator has the disadvantages that both the magnetic flux of the magnet and the utilization of magnetic energy are not high, the magnetic field leaks and is easily interfered, such that the efficiency is poor and power generation is small.

The induced voltage is determined by the number of coils and the change of the magnetic flux. In order to increase the efficiency in power generation, the relative speed between the magnet and the coil has to be increased so as to increase the magnetic flux rate. Using a multi-polar magnet can increase the switching frequency of the magnetic flux, however, the multi-polar magnet suffers from low magnetic working point with the constraint of shape and size.

SUMMARY OF THE INVENTION

The invention is directed to a displacement type generator. A multi-polar magnetic structure is used for converting a unidirectional magnetic flux of the magnet into a multi-polar magnetic flux, so that the working point of the magnet is raised, such that the magnetic flux of the magnet is effectively used. The displacement type generator has the advantage of requiring small magnitude of movement but producing high reliability, utilizing the magnetic properties of the materials effectively to achieve high efficiency in the conversion of electric energy.

According to a first aspect of the present invention, a displacement type generator is provided. The displacement type generator includes a magnet set and a coil set. The magnet set includes a magnet with unidirectional magnetization and a first multi-polar magnetic structure, wherein the first multi-polar magnetic structure is disposed on the magnet. The coil set includes a magnetic center pole, a coil and a second multi-polar magnetic structure. The coil is wound on the magnetic center pole. The second multi-polar magnetic structure is disposed on the magnetic center pole and is adjacent to the first multi-polar magnetic structure. As a relative movement is generated between the magnet set and the coil set, the magnetic flux changes and causes the coil to output an induced voltage.

The invention will become apparent from the following detailed description of the preferred but non-limiting embodiments. The following description is made with reference to the accompanying drawings.

DETAILED DESCRIPTION OF THE INVENTION

Figure 1:
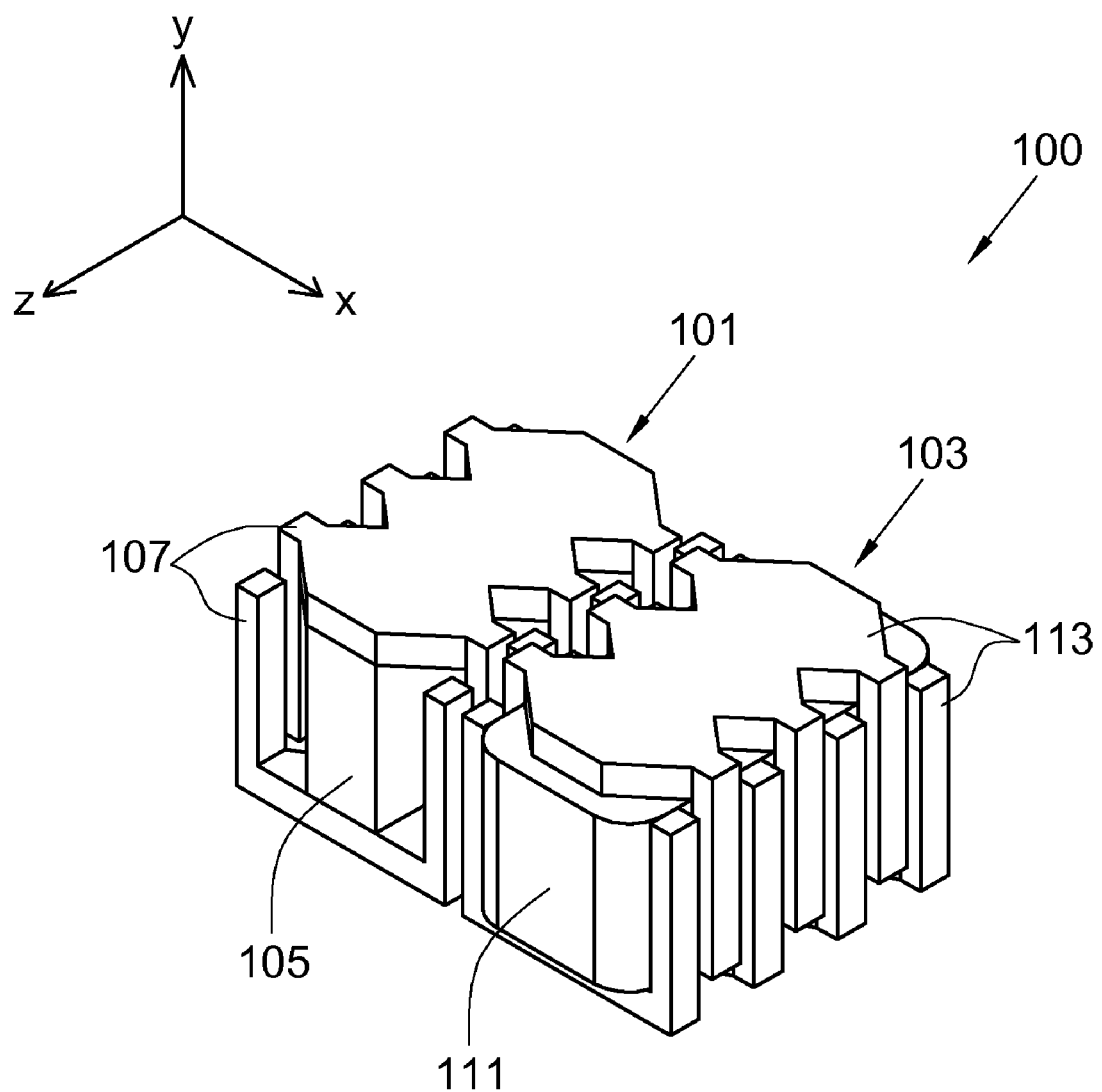
FIG. 1 illustrates a displacement type generator according to an embodiment of the invention.
Figure 2:
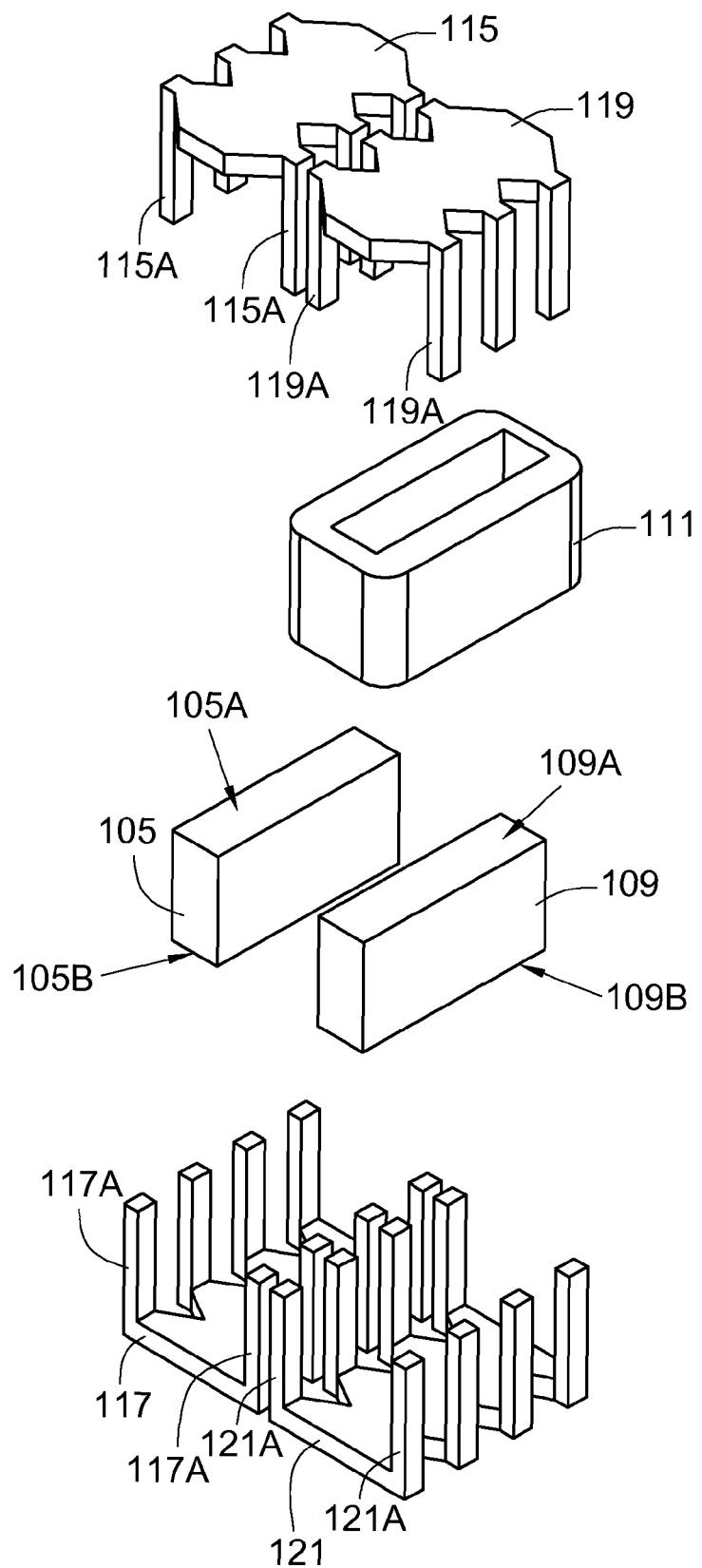
FIG. 2 illustrates an explosion diagram of the displacement type generator in FIG. 1.

Referring to FIGS. 1, 2, FIG. 1 illustrates a displacement type generator according to an embodiment of the invention and FIG. 2 illustrates an explosion diagram of the displacement type generator in FIG. 1. As indicated in FIG. 1, the displacement type generator 100 includes a magnet set 101 and a coil set 103. The magnet set 101 includes a magnet 105 with unidirectional magnetization and a first multi-polar magnetic structure 107, wherein the first multi-polar magnetic structure 107 is disposed on the magnet 105. The coil set 103 includes a magnetic center pole 109 (shown in FIG. 2), a coil 111 and a second multi-polar magnetic structure 113. The coil 111 is wound on the magnetic center pole 109. The second multi-polar magnetic structure 113 is disposed on the magnetic center pole 109 and is adjacent to the first multi-polar magnetic structure 107. As a relative movement is generated between the magnet set 101 and the coil set 103, the magnetic flux changes and causes the coil 111 to output an induced voltage.

The components in FIG. 2 are elaborated below one by one. The design of the magnet set 101 is first elaborated. The magnet 105 has a first surface 1 05A and a second surface 1 05B opposite to each other. The magnet 105, being a magnet with unidirectional magnetization, has a first magnetic polarity, such as an S pole, at the first surface 105A, and a second magnetic polarity, such as an N pole, at the second surface 105B. The second magnetic polarity and the first magnetic polarity are opposite to each other. In the embodiment, the magnet 105 can be a bar structure whose length is determined according to actual needs.

The first multi-polar magnetic structure 107 (shown in FIG. 1) connects the first surface 105A and the second surface 105B of the magnet 105 for converting a unidirectional magnetic flux of the magnet 105 into a multi-polar magnetic flux. As shown in FIG. 2, the first multi-polar magnetic structure 107, constituted by two U-tooth-shaped multi-polar structures, includes a first plate 115 and a second plate 117, wherein the first plate 115 is disposed on the first surface 105A, and the second plate 117 is disposed on the second surface 105B. The first plate 115 has sesveral first polar teeth 115A extended towards the second surface 105B. The second plate 117 has several second polar teeth 117A extended towards the first surface 105A. And, any of the first polar teeth 115A is located between two second polar teeth 117A, and any of the second polar teeth 117A is located between two first polar teeth 115A. That is, the first polar teeth 115A and the second polar teeth 117A are alternately disposed, so that both the front and the rear of the first polar teeth 115A are adjacent to a second polar tooth 117A, and both the front and the rear of a second polar tooth 117A are also adjacent to a first polar tooth 115A. Additionally, the first polar teeth 115A is perpendicular to the first surface 105A, and the second polar teeth 117A is perpendicular to the second surface 105B and parallel to the first polar teeth 115A.

In the present embodiment of the invention, the direction of the relative movement between the magnet set 101 and the coil set 103 is perpendicular to the extending direction of the first polar teeth 115A, and the winding direction of the coil 111 is also perpendicular to the extending direction of the first polar teeth 115A.

As shown in FIG. 1, the extending direction of the first polar teeth 115A is a negative y direction for example. The displacement type generator 100 can be driven by directly applying an external force to the shifting direction of the generator 100, such as a z direction, or applying an external force to a direction perpendicular to the shifting direction of the generator 100, such as a y direction, and then the movement in y direction is converted to the shifting direction of the generator 100 such as the z direction through a linkage mechanism. The direction of the relative movement between the magnet set 101 and the coil set 103 can be a positive z or a negative z direction, and the coil 111 is wound along an x-z plane for example. The relative movement between the magnet set 101 and the coil set 103 can be implemented by moving the magnet set 101 relatively to the fixed coil set 103 or by moving the coil set 103 with respect to the fixed magnet set 101.

In terms of an implementation, as shown in FIG. 2, the first polar teeth 115A are equally divided into two groups and are symmetrically disposed on two opposite sides of the magnet 105 and around the magnet 105, and the second polar teeth 117A are also divided into two groups and are also symmetrically disposed on two opposite sides of the magnet 105 and around the magnet 105.

The magnet 105 has opposite magnetic polarities at the first surface 105A and at the second surface 105B. For example, the first magnetic polarity of the first surface 105A is an S pole, and the second magnetic polarity of the second surface 105B is an N pole, such that the first plate 115 and the second plate 117 disposed on the first surface 105A and the second surface 105B respectively have opposite magnetic polarities. That is, the first plate 115 is an S pole, and the second plate 117 is an N pole. The first polar teeth 115A and the second polar teeth 117A have opposite magnetic polarities. Thus, the first polar teeth 115A is an S pole, and the second polar teeth 117A is an N pole. As the first polar teeth 115A and the second polar teeth 117A are alternately disposed, the unidirectional magnetic flux of the magnet 105 is converted into a multi-polar magnetic flux by the alternate S pole and the N pole.

Figure 3:
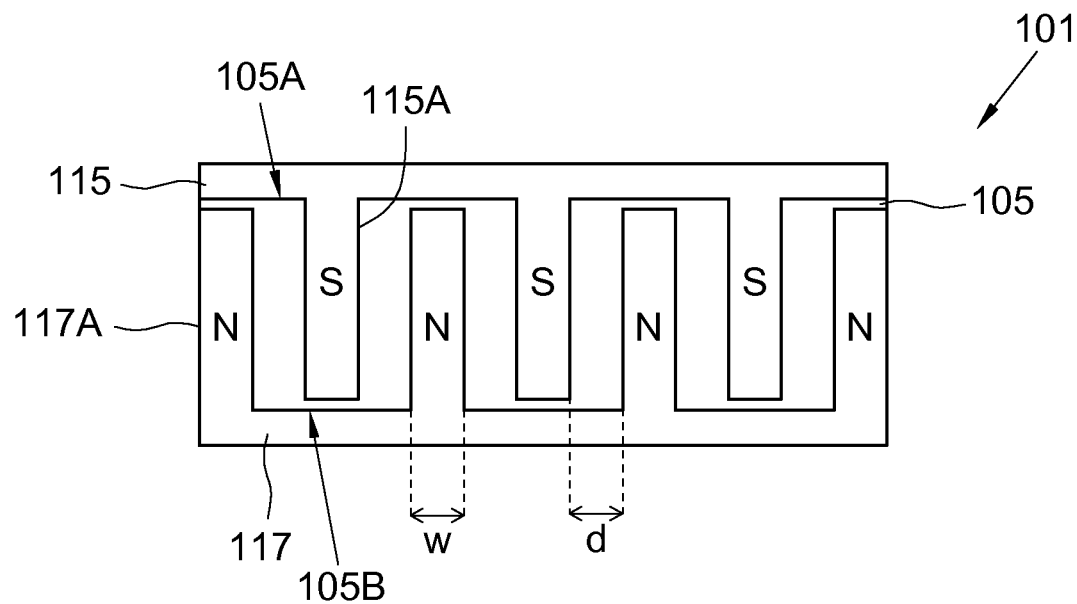
FIG. 3 illustrates a side view of a magnet set in FIG. 1.

Referring to FIG. 3, a side view of a magnet set in FIG. 1 is shown. For example, on the part of the magnet 105, the first magnetic polarity at the first surface 105A is an S pole, and the second magnetic polarity at the second surface 105B is an N pole, such that the first plate 115 and its first polar teeth 115A are an S pole, and the second plate 117 and its second polar teeth 117A are an N pole. As the first polar teeth 115A and the second polar teeth 117A are alternately disposed, and each has an S pole and an N pole, the arrangement of magnetic polarity in the form of N-S-N-S-N-S-N is provided, and as what is anticipated, the unidirectional magnetic flux of the magnet 105 is converted into a multi-polar magnetic flux.

As shown in FIG. 2, the magnetic center pole 109 has a third surface 109A and a fourth surface 109B opposite to each other. The coil 111 is wound on a surface connecting the third surface 109A and the fourth surface 109B. The second multi-polar magnetic structure 113, constituted by two U-tooth-shaped multi-polar structures, includes a third plate 119 and a fourth plate 121, wherein the third plate 119 is disposed on the third surface 109A, and the fourth plate 121 is disposed on the fourth surface 109B.

The third plate 119 has several third polar teeth 11 9A extended towards the fourth surface 109B, and the fourth plate 121 has several fourth polar teeth 121A extended towards the third surface 109A. Additionally, the third polar teeth 119A are perpendicular to the third surface 109A, and the fourth polar teeth 121A are perpendicular to the fourth surface 109B and parallel to the third polar teeth 119A.

In the implementation, the third polar teeth 119A are divided into two groups and are symmetrically disposed on two opposite sides of the magnetic center pole 109 and around the magnetic center pole 109. The fourth polar teeth 121A are also divided into two groups and are symmetrically disposed on two opposite sides of the magnetic center pole 109 and around the magnetic center pole 109. Moreover, the third polar teeth 119A and the fourth polar teeth 121A are also alternately disposed. The third polar teeth 119A and the fourth polar teeth 121A are arranged in the same way as that of the first polar teeth 115A and the second polar teeth 117A as shown in FIG. 3. In the present embodiment of the invention, both the first and the second multi-polar magnetic structures 107 and 113 are constituted by two U-tooth-shaped multi-polar structures. The first, the second, the third and the fourth polar teeth 115A, 117A, 119A and 121A, which are extended from the first and the second multi-polar magnetic structures 107 and 113, can be constituted by the structures with different shapes.

Moreover, in the present embodiment of the invention, the displacement type generator 100 is constituted by a magnet set 101 and a coil set 103 adjacent to magnet set 101, however the invention is not limited thereto. With more magnet sets 101 and coil sets 103 being alternately disposed, the displacement type generator achieves the same or even better efficiency of power generation, which is not repeated here.

The first plate 115 and the second plate 117 of the first multi-polar magnetic structure 107, the third plate 119 and the fourth plate 121 of the second multi-polar magnetic structure 113, and the magnetic center pole 109 can all be made from materials such as iron, cobalt, nickel, a compound of the above metals, or a magnetic oxide of the above metals. Examples of the magnetic oxide include Mn—Zn ferrite, Ni—Zn ferrite, Li—Zn ferrite or a combination thereof.

Because the unidirectional magnetic flux of the magnet set 101 is converted into a multi-polar magnetic flux and the multi-polar magnetic flux passes through the gap between the magnet set 101 and the coil set 103, the multi-polar magnetic flux is directed into the coil 111 by the second multi-polar magnetic structure 113 and the magnetic center pole 109 of the coil set 103. Thus, as a relative movement is generated between the magnet set 101 and the coil set 103, the coil 111 generates an induced voltage according to the change of the magnetic flux. Moreover, with the disposition of the first multi-polar magnetic structure 107, the second multi-polar magnetic structure 113 and the magnetic center pole 109, the magnetic flux lines are intensively distributed and form a closed-loop magnetic circuit, and the working point of the magnet 105 is raised. Due to the design that the magnetic polarity of the first multi-polar magnetic structure 107 and the magnetic polarity of the second multi-polar magnetic structure 113 are alternately disposed, small moving displacement suffices for generating enough magnetic flux change. Therefore, the displacement type generator 100 of the present embodiment of the invention has high reliability.

The induced voltage is determined according to the number of turns of the coil and the change of the magnetic flux. In the present embodiment of the invention, the magnet 105 of the displacement type generator 100 has higher working points, so that both the density of the magnetic flux and the change rate of the magnetic flux are increased when a relative movement is generated between the magnet set 101 and the coil set 103. The displacement type generator 100 of the present embodiment of the invention is tested under the condition of predetermined parameters.

For the test of the present embodiment of the invention, a low carbon steel sheet having a thickness of 1 mm is used and processed by wire cutting to form the U-tooth-shaped multi-polar structures that are used as the first plate 115, the second plate 117, the third plate 119 and the fourth plate 121. The tooth width w (shown in FIG. 3) and the tooth distanced (shown in FIG. 3) are both 2 mm. The magnet set 101 is constituted by the first plate 115, the second plate 117, and the magnet 105, wherein the magnet 105 is made of neodymium-iron-boron. The coil set 103 is constituted by the third plate 119, the fourth plate 121, the magnetic center pole 109 and the coil 111, wherein the magnetic center pole 109 is also made of low carbon steel. The conductive wire of the coil 111 has a diameter of 0.33 mm, and number of turns of the coil 111 is 60.

Figure 4:
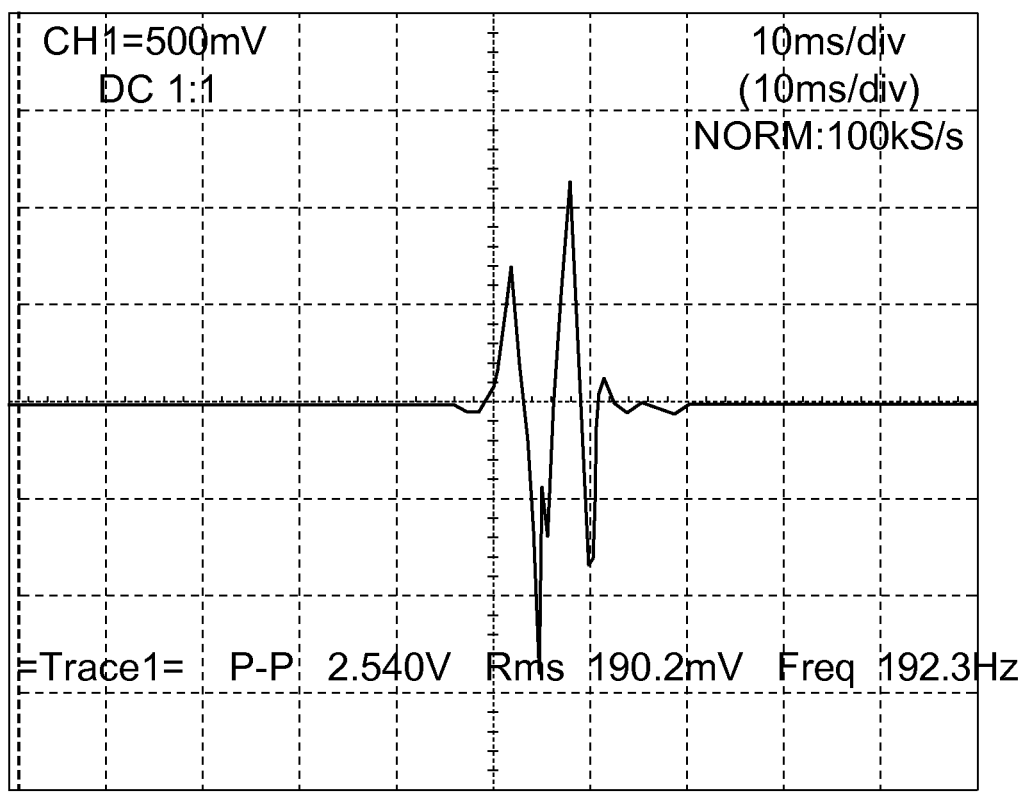
FIG. 4 illustrates a testing result of measurement based on predetermined parameters.

During the test, a pneumatic cylinder provides a driving force for the generator 100, wherein the magnet set 101 is fixed and the coil set 103 is moved. The induced voltage of the coil 111 is measured by an oscilloscope, and the loading resistance is 20 Ω. Referring to FIG. 4, a testing result of measurement based on predetermined parameters is shown. As illustrated in FIG. 4, the coil 111 has an induced voltage Vp-p equal to about 2.54 V, the speed of the relative movement between the magnet set 101 and the coil set 103 is 4 mm/2.6 ms, and the induction power Pp is equal to 80 mW, which is calculated from the induced voltage and the loading resistance. The displacement type generator 100 of the present embodiment of the invention indeed has high electric energy conversion efficiency.

According to the displacement type generator disclosed in the above embodiment of the invention, a multi-polar magnetic structure is used for converting a unidirectional magnetic flux of the magnet into a multi-polar magnetic flux, so that the magnetic flux lines are intensively distributed and the working point of the magnet is raised, the magnetic flux of the magnet is effectively used, even a small magnitude of movement would cause magnetic flux change, and the generator has high reliability. The present invention not only utilizes the magnetic properties of the materials effectively but also achieves high efficiency in the conversion of electric energy. Besides, as energy shortage is getting worse and environmental consciousness is getting higher, many researches are directed to harvesting the energy from people's everyday activities, to obtain a new type of electric energy which is both environmental friendly and convenient. The displacement type generator of present embodiment of the invention has high efficiency in the conversion of electric energy, and is further combined with the appliances used in everyday life to effectively convert the energy generated in people's everyday activities into usable energy, hence conforming to the needs of environmental conservation.

While the invention has been described by way of example and in terms of an embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A displacement type generator, comprising:
    a magnet set, comprising:
        a magnet with unidirectional magnetization; and
        a first multi-polar magnetic structure disposed on the magnet; and
    a coil set, comprising:
        a magnetic center pole;
        a coil wound on the magnetic center pole; and
        a second multi-polar magnetic structure disposed on the magnetic center pole and adjacent to the first multi-polar magnetic structure;
    wherein as a relative movement is generated between the magnet set and the coil set, the magnetic flux changes and causes the coil to output an induced voltage.

2. The displacement type generator according to claim 1, wherein the magnet has a first surface and a second surface opposite to each other, the magnet has a first magnetic polarity at the first surface and a second magnetic polarity at the second surface, the second magnetic polarity and the first magnetic polarity are opposite to each other, and the first multi-polar magnetic structure connects the first surface and the second surface and converts a unidirectional magnetic flux of the magnet into a multi-polar magnetic flux.

3. The displacement type generator according to claim 2, wherein the first multi-polar magnetic structure comprises:
   a first plate disposed on the first surface, wherein the first plate has a plurality of first polar teeth extended towards the second surface; and
   a second plate disposed on the second surface, wherein the second plate has a plurality of second polar teeth extended towards the first surface, and the first polar teeth and the second polar teeth are alternately disposed.

4. The displacement type generator according to claim 3, wherein the first polar teeth are perpendicular to the first surface, and the second polar teeth are perpendicular to the second surface and parallel to the first polar teeth.

5. The displacement type generator according to claim 4, wherein a direction of the relative movement between the magnet set and the coil set is perpendicular to an extending direction of the first polar teeth.

6. The displacement type generator according to claim 3, wherein the first polar teeth are symmetrically disposed on two opposite sides of the magnet, and the second polar teeth are symmetrically disposed on the two opposite sides of the magnet.

7. The displacement type generator according to claim 3, wherein a winding direction of the coil is perpendicular to an extending direction of the first polar teeth.

8. The displacement type generator according to claim 3, wherein the magnetic center pole has a third surface and a fourth surface opposite to each other, the coil is wound on a fifth surface connecting the third surface and the fourth surface, and the second multi-polar magnetic structure comprises:
   a third plate disposed on the third surface, wherein the third plate has a plurality of third polar teeth extended towards the fourth surface, and the third polar teeth are adjacent to the first polar teeth and the second polar teeth; and
   a fourth plate disposed on the fourth surface, wherein the fourth plate has a plurality of fourth polar teeth extended towards the third surface, and the third polar teeth and the fourth polar teeth are alternately disposed.

9. The displacement type generator according to claim 8, wherein the third polar teeth are perpendicular to the third surface, and the fourth polar teeth are perpendicular to the fourth surface and parallel to the third polar teeth.

10. The displacement type generator according to claim 8, wherein the third polar teeth are symmetrically disposed on two opposite sides of the magnetic center pole, and the fourth polar teeth are symmetrically disposed on the two opposite sides of the magnetic center pole.

11. The displacement type generator according to claim 1, wherein at least one of the materials of the first multi-polar magnetic structure, the second multi-polar magnetic structure and the magnetic center pole is selected from a group comprising iron, cobalt, nickel, a compound of the above metals, or a magnetic oxide of the above metals.

12. The displacement type generator according to claim 11, wherein the magnetic oxide is composed of Mn—Zn ferrite, Ni—Zn ferrite, Li—Zn ferrite or a combination of the above materials.

* * * * *